No. 838,020.
PATENTED DEC. 11, 1906.
J. C. GIBLER.
NUT LOCK.
APPLICATION FILED MAY 9, 1906.
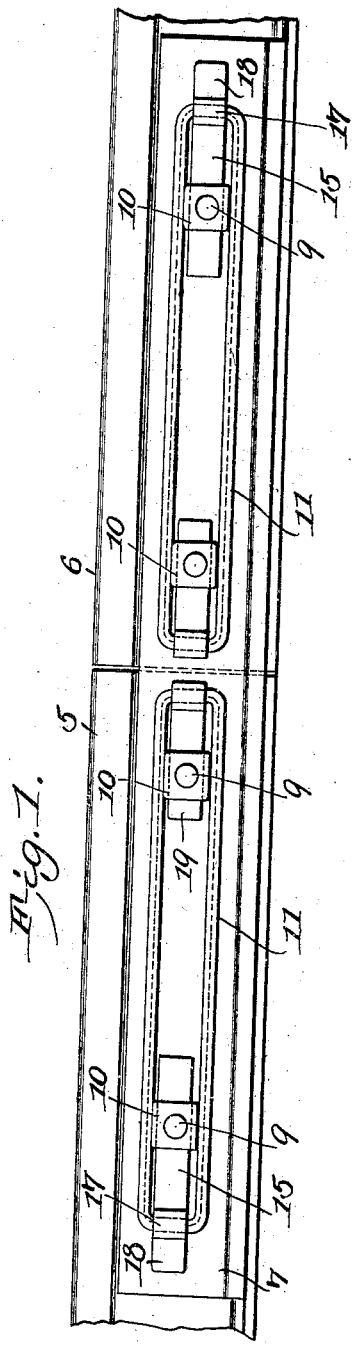
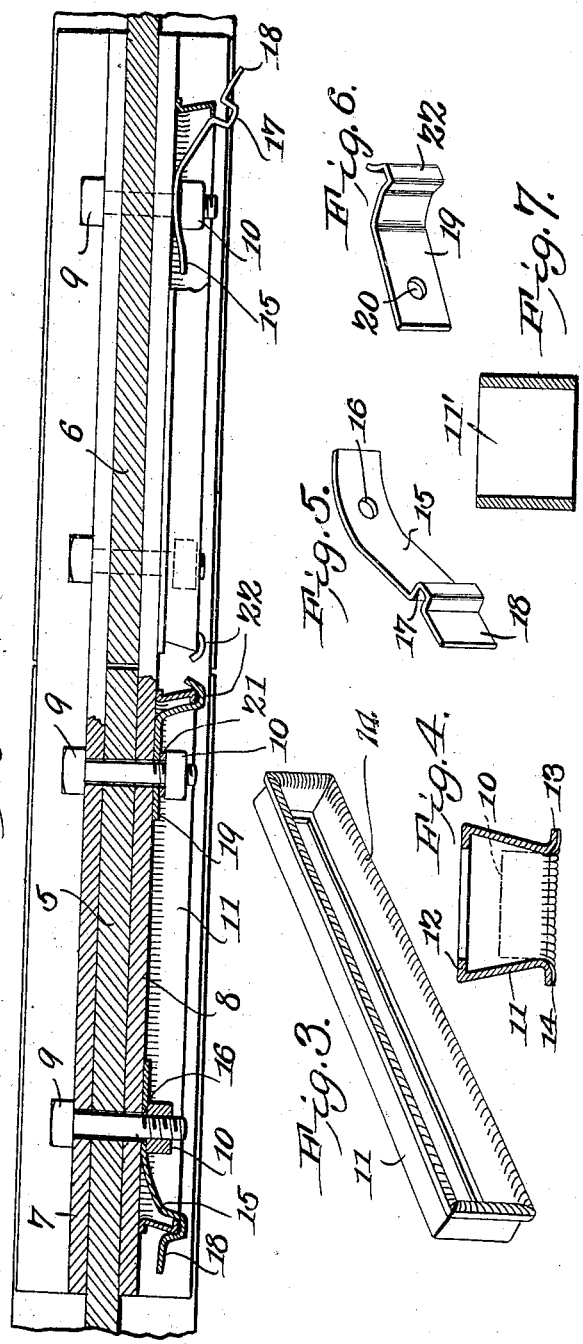
John C. Gibler, INVENTOR.
WITNESSES:
ATTORNEYS

UNITED STATES PATENT OFFICE.

JOHN C. GIBLER, OF HURDLAND, MISSOURI, ASSIGNOR OF ONE-HALF TO SAMUEL C. SURRY, OF HURDLAND, MISSOURI.

NUT-LOCK.

No. 838,020.   Specification of Letters Patent.   Patented Dec. 11, 1906.

Application filed May 9, 1906. Serial No. 315,993.

*To all whom it may concern:*

Be it known that I, JOHN C. GIBLER, a citizen of the United States, residing at Hurdland, in the county of Knox and State of Missouri, have invented a new and useful Nut-Lock, of which the following is a specification.

This invention relates to nut-locks, and has for its object to provide a comparatively simple and inexpensive device of this character for preventing accidental rotation of nuts on bolts employed for connecting the mating ends of rail-sections.

A further object of the invention is to provide a link or keeper adapted to embrace two or more of the nuts and having one face thereof formed with teeth or serrations adapted to bear against the adjacent fish-plate to assist in preventing accidental movement of said link and nuts.

A further object is to provide a plurality of clamping members adapted to engage and lock the link or keeper in position on the fish-plate, said members being retained in position by engagement with the bolts and serving as washers for the nuts.

A further object is to generally improve this class of devices so as to increase their utility, durability, and efficiency, as well as to reduce the cost of manufacture.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

In the accompanying drawings, forming a part of this specification, Figure 1 is a side elevation of a pair of mating rail-sections, showing a nut-lock constructed in accordance with my invention applied thereto. Fig. 2 is a longitudinal sectional view of the same, showing one of the spring locking members in elevated or released position. Fig. 3 is a perspective view of one of the links or keepers detached. Fig. 4 is a transverse sectional view of the same. Fig. 5 is a perspective view of one of the locking members detached. Fig. 6 is a similar view of the adjacent member. Fig. 7 is a transverse sectional view illustrating a modified form of the link or keeper.

Similar numerals of reference indicate corresponding parts in all of the figures of the drawings.

The improved device is principally designed for preventing accidental rotation of nuts on bolts used for connecting the mating ends of rail-sections and by way of illustration is shown applied to a rail-joint of the ordinary construction, in which 5 and 6 designate the rail-sections, 7 and 8 the fish-plates, and 9 the bolts extending transversely through suitable openings in the rails and fish-plates, respectively, and having their free ends threaded for the reception of bolts 10.

Mounted on one of the fish-plates 8 is a link or keeper 11, preferably rectangular in shape, as shown, and adapted to embrace the nuts 10. The longitudinal and transverse edges of the link at one side thereof are formed with inwardly-extending reinforcing-flanges 12, while the longitudinal and transverse edges of the link at the opposite sides thereof are formed with outwardly-extending flanges 13, the walls of which are provided with a plurality of spaced teeth or serrations 14, adapted to bear against the adjacent fish-plate and assist in preventing accidental movement of said link and also to assist in preventing rotation of the nuts within the link. The side walls of the link 11 converge toward the flange 13, while the distance between the flanges 12 is preferably equal to the width of the nuts, so as to permit the link or keeper to be readily positioned on the fish-plate. As a means for locking the link or keeper in engagement with the nuts there is provided a spring locking member 15, having an opening 16 formed in one end thereof for the reception of one of the bolts 9, while its opposite end is bent to form a rectangular recess or socket 17, adapted to engage one end of the link, and terminates in an operating-handle 18.

The perforated end of the locking member 15 is curved laterally and interposed between the nut and the adjacent fish-plate, so as to form, in effect, a spring-washer, while the side walls of the socket 17 engage the interior and exterior walls of the link at the flange 12, and thus prevent longitudinal movement of said link.

Mounted on the transverse bolt, at the opposite end of the link, is a clamping member 19, also provided with a perforation 20 for the reception of the bolt, there being a washer 21 interposed between the nut and the perforated end of the plate 19. The free end of the clamping member 19 is bent to form a terminal hook 22, adapted to engage the adjacent end of the link at the flange 12 and retain said link in contact with the fish-plate, as shown.

It will thus be seen that the locking members 15 and 19 by engagement with the link serve to prevent longitudinal movement of the latter and also yieldably support the same in contact with the adjacent fish-plate, while the inner end of the member 15 serves as a washer for the adjacent nut.

By having the links mounted on the fish-plate and embracing the nuts, as shown, said nuts are effectually locked against accidental rotation, thus preventing the nuts from working loose and the bolts becoming detached.

In Fig. 7 of the drawings there is illustrated a modified form of the invention in which the link 11' is formed with smooth unobstructed exterior and interior walls and the teeth or serrations dispensed with, the clamping members being employed to retain the link in position on the fish-plate in the manner before described.

While the device is principally designed for use on rail-joints, it is obvious that the same may be used with equally good results on bridge structures, iron buildings, or wherever a device of this character is found desirable.

From the foregoing description it will be seen that there is provided an extremely simple, inexpensive, and efficient device admirably adapted for the attainment of the ends in view.

Having thus described the invention, what is claimed is—

1. The combination with the rail-sections and fish-plates, of bolts passing through the rail-sections and the fish-plates and provided with nuts, a link embracing the nuts and having one face thereof serrated for engagement with the adjacent plate and its side walls converging toward the serrated face thereof, and means for locking the link in position on said fish-plate.

2. The combination with the rail-sections and fish-plates, of bolts passing through the rail-sections and fish-plates and provided with nuts, a link embracing the nuts and provided with longitudinal and transverse reinforcing-flanges, and spring locking members carried by the bolts and provided with terminal sockets adapted to engage the transverse flanges for retaining the link in position on the fish-plate.

3. The combination with the rail-sections and fish-plates, of bolts passing through the rail-sections and fish-plates and provided with nuts, a link embracing the nuts and bearing against the adjacent fish-plates, said link being provided with a laterally-extending reinforcing-flange and clamping members carried by the nuts and provided with sockets adapted to engage the flanges at the opposite ends of the link.

4. The combination with the rail-sections and fish-plates of bolts passing through the rail-sections and fish-plates and provided with nuts, a link having its side walls tapering and provided with a laterally-extending flange the walls of which are serrated and adapted to bear against the adjacent fish-plate, and means carried by the nuts and adapted to engage the link for locking the latter in engagement with the nuts.

5. The combination with the rail-sections and fish-plates, of bolts passing through the rails and fish-plates and provided with nuts, a link embracing the nuts and bearing against the adjacent fish-plate, a locking member having one end thereof bent laterally and interposed between the fish-plate and nut at one end of the link and having its opposite end provided with a socket adapted to engage the link, a clamping-plate disposed at the opposite end of the link and interposed between the adjacent fish-plate and nut and having its free end bent laterally into engagement with the link, and a washer interposed between the clamping member and the adjacent nut.

6. The combination with the rail-sections and fish-plates, of bolts passing through the rail-sections and fish-plates and provided with nuts, a link embracing the nuts and bearing against the adjacent fish-plate, and a spring locking member engaging one of the bolts and having its free end provided with a socket adapted to receive one end of the link, the free end of the spring locking member being extended beyond the closed end of said link to form a terminal operating-handle.

In testimony that I claim the foregoing as my own I have hereto affixed my signature in the presence of two witnesses.

JOHN C. GIBLER.

Witnesses:
 HOMER BLOCK,
 L. C. SCHENIMANN.